Oct. 19, 1943.  C. J. CONKLE  2,332,061
ONE-WAY COUPLING DEVICE
Filed March 18, 1942  2 Sheets-Sheet 1
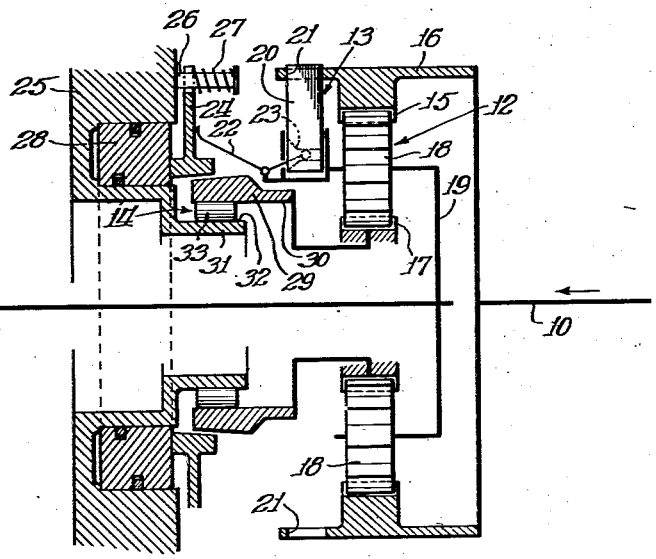
Fig. 1
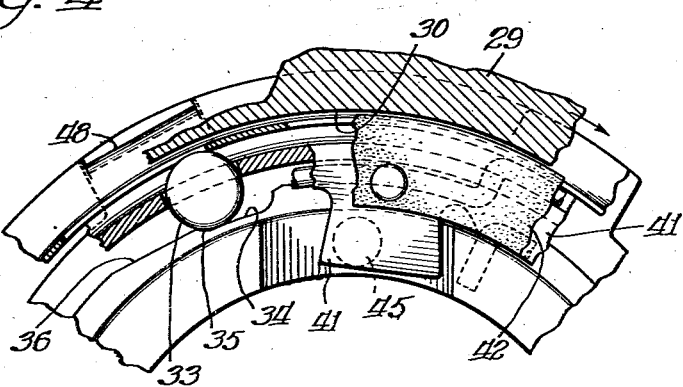
Fig. II
Inventor:
Carl J. Conkle
By Edward C. Fritzbaugh
Atty.

Oct. 19, 1943.   C. J. CONKLE   2,332,061
ONE-WAY COUPLING DEVICE
Filed March 18, 1942   2 Sheets-Sheet 2

Inventor:
Carl J. Conkle
By: Edward C. Fitzhugh
Atty.

Patented Oct. 19, 1943

2,332,061

UNITED STATES PATENT OFFICE 2,332,061

ONE-WAY COUPLING DEVICE

Carl J. Conkle, Muncie, Ind., assignor to Borg-Warner Corporation, Chicago, Ill., a corporation of Illinois Application March 18, 1942, Serial No. 435,236

6 Claims. (Cl. 188—81)

This invention relates to one-way coupling devices such as one-way brakes or clutches and particularly to a control means therefor.

For purposes of illustration this invention will be described with reference to a one-way brake of the roller and cam type, but it is understood that the invention is applicable generally to brakes or clutches of the one-way type whether they use rollers, balls, sprags, or any other type of wedge for effecting a coupling between two elements at least one of which is rotatable.

In the usual construction of one-way brake of the roller-and-cam type, a stationary element is provided having a serrated surface comprising a plurality of roller receiving depressions connected to a cam surface. A rotary member to be braked is formed with a cylindrical surface or, in general, with a surface generated by rotating a line about the axis of rotation of the member, the surface being spaced from the serrated surface of the stationary member. Rollers are placed in the depressions in the serrated surface and a roller cage is then provided for the rollers, with resilient means reacting against the cage and stationary member to urge the cage and the rollers retained therein along the cam surface away from the roller recesses. When the direction of rotation of the rotatable member is toward the recesses so as to oppose the resilient means, the rollers are urged toward the recesses and the two members are relatively free, that is, the rotatable member can rotate relative to the fixed member. When the direction of rotation is in the opposite sense, the force of friction between the rollers and the cylindrical surface tends to urge the rollers upon the cam surfaces, and since these surfaces are arranged progressively to decrease the distance between the cylindrical surface and the serrated surface, a wedging action is secured which locks the heretofore rotatable member against rotation.

It has been found, however, that during such time as the direction of rotation is in favor of releasing the connection, the constant bias of the resilient means causes the rollers to be in continuous contact with the rotating surface, thereby causing undue wear of the surface and rollers. This undue wear is of course undesirable and particularly where in severe cases the cylindrical surface is actually scored by the rollers.

The principal object of this invention therefore is to provide a control for the wedge means of a one-way coupling device wherein the wedge means is held out of contact with the rotatable elements while said element is rotating in one direction, but which permits contact between the wedge means and rotatable surface when said surface tends to rotate in the opposite direction, said control means being automatic in its operation.

A more specific object of this invention is to provide a control means for a roller cage of a roller-and-cam type one-way device wherein a constant yieldable bias is provided to urge the rollers into contact with the rotatable surface and wherein the constant bias is balanced by a frictional force developed by the rotation of said rotatable element.

A still more specific object of this invention is to provide, in a roller-and-cam one-way device having a constantly effective resilient means for urging the rollers into contact with the rotatable element of the device, a counter-balancing force for the constant bias developed frictionally by the rotation of the rotatable element, said counter-balancing force being just sufficient to effect the result desired without unduly heating or wearing any part of the one-way device.

These and other objects and features of the invention will be apparent from the following description when taken together with the accompanying drawings in which:

Fig. 1 is a diagrammatic illustration of a mechanism in which a one-way device is employed;

Fig. 4 is a fragmentary section through the device corresponding to Fig. 3 but showing the device in released position.

Figure 2:
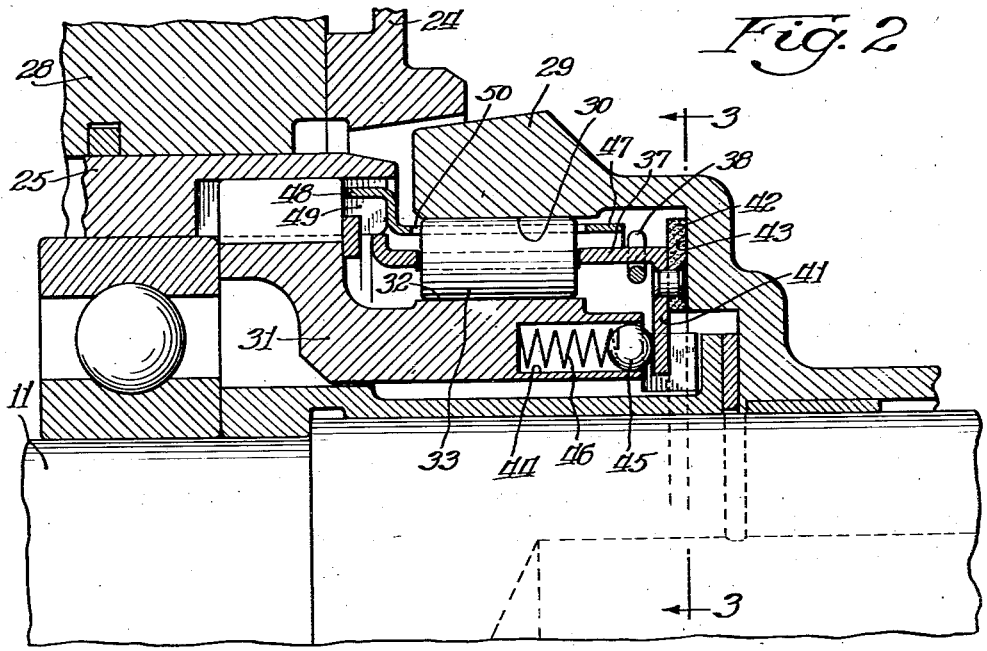
Fig. 2 is an enlarged and more detailed fragmentary section through the one-way device and the novel control means therefor, the section being taken along line 2—2 of Fig. 3.

Referring now specifically to the drawings for a detailed description of the invention, and particularly to Fig. 1, the mechanism illustrated is one which embodies advantageously the invention hereinafter described. The mechanism is a planetary reduction gear such as is disclosed in a copending application of William E. Moffitt, Serial No. 372,030, filed December 28, 1940, and comprises a drive shaft 10, a driven shaft 11 and a change speed planetary gear set 12 connected therebetween, with a positive clutch device 13 for directly connecting drive shaft 10 and driven shaft 11 to provide a direct drive therebetween and with a one-way brake 14 for arresting the rotation of one of the elements of the planetary gear set 12 when clutch device 13 is released, to provide a reduced speed drive between shafts 10 and 11. Planetary gear set 12 is comprised of a ring gear 15 mounted and rotatable with a cylindrical shell 16 which is secured to drive shaft 10, a sun gear 17 coaxial with ring gear 15, and a plurality of planet gears 18 meshing with sun gear 17 and ring gear 15. Planet gears 18 are mounted on a carrier 19 which is directly connected to driven shaft 11. Said carrier 19 supports one or more radially slidable pawls 20 which are adapted to engage slots 21 in cylindrical shell 16 to provide a positive connection between carrier 19 and shell 16. Means (not shown) are provided for normally urging pawls 20 into slots 21. Withdrawal of a pawl 20 from a slot 21 is accomplished by means of a bell crank 22 pivotally mounted on carrier 19 and having one arm engaging a suitable opening 23 in pawl 20. The other arm of bell crank 22 is adapted to engage a plate 24 which is non-rotatably supported from the casing 25 by means of pins 26 extending axially therefrom and passing through suitable openings in plate 24. Springs 27 normally urge plate 24 to the left (Fig. 1) which corresponds to the engaged position of pawl 20. Plate 24 may be moved in the opposite direction by means of a piston 28 operated by suitable hydraulic means (not shown), thereby rotating bell-crank 22 clockwise as seen in Fig. 1 to withdraw pawl 20 from slot 21. For other details of construction of the mechanism shown in Fig. 1 reference may be had to the aforementioned Moffitt application.

One-way brake 14 is comprised of a shell 29 which is secured to and rotatable with sun gear 17. Rotatable element 29 is provided with a cylindrical surface 30 which is telescoped over a stationary element 31 extending axially from casing 25. The outer surface 32 of element 31 is serrated as will be described hereinafter to provide a plurality of cam surfaces. Between elements 31 and 29 are rollers 33 which constitute the wedge means for providing a lock between elements 29 and 31 when sun gear 17 is to be held against rotation.

It will be apparent that when clutch 13 is engaged sun gear 17 will be rotated in the same direction as drive shaft 10, but when clutch 13 is disengaged, the reaction of the load in shaft 11 will cause sun gear 17 to rotate in a reverse direction with respect to drive shaft 10. This reverse rotation, however, is prevented by means of one-way brake 14, and with sun gear 17 held against rotation by said brake, torque will be transmitted to driven shaft 11 in a multiplied condition. It will be noted that while sun gear 17 is rotating, relative motion must exist between the parts associated therewith and the parts associated with the stationary housing.

Figure 3:
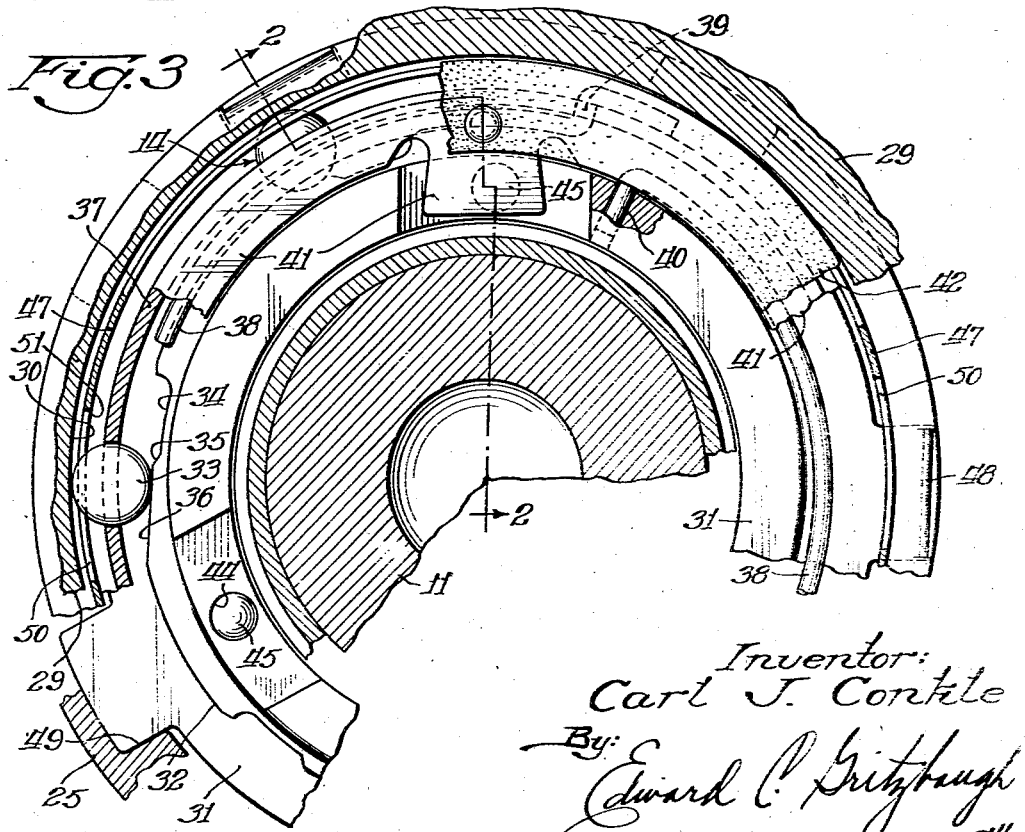
Fig. 3 is a section through the device of Fig. 2 taken along lines 3—3 thereof.

Referring now to Figs. 2 and 3 for a detailed description of the one-way device and the novel control means therefor, stationary element 31 is provided with recesses 34 which are connected by a short ramp 35 to cam surfaces 36 which slope outwardly toward cylindrical surface 30 on rotatable element 29. Rollers 33 are retained in a cage 37 which is normally resiliently biased in a counterclockwise direction, as viewed in Fig. 3, by a spring 38. Said spring is anchored in cage 37 at 39 and in stationary element 31 at 40. With this arrangement, rollers 33 are always in readiness to become effective as wedges to prevent the rotation of element 29 and its associated sun gear 17 when the latter tends to rotate in a counterclockwise direction as viewed in Fig. 3. If no additional control means were provided for cage 37, however, rollers 33 would be in continuous frictional contact with cylindrical surface 30 even when the latter were rotating, and the continuous frictional engagement, aggravated by vibrations produced by the prime mover (not shown), results in excessive wear, heating and even scoring of surface 30. The additional control provided to prevent continuous frictional contact between rollers 33 and cylindrical surface 30 is shown in Fig. 2. Cage 37 is formed with a radially inwardly depending flange 41 to which is riveted or otherwise secured a washer 42 made from friction material such as is used in clutches or brakes. Rotatable element 29 is formed with a radial friction surface 43 adjacent washer 42 such that the latter may engage friction surface 43 so as to be moved thereby. To insure an engagement between washer 42 and friction surface 43, stationary element 31 is bored axially in one or more places as at 44 to receive a ball 45 and a spring 46 which constantly urges ball 45 outward. Flange 41 on cage 37 extends radially inwardly sufficiently far to be contacted by ball 45, thereby being likewise urged to the right as seen in Fig. 2.

Thus when rotatable element 29 is rotated in a direction which would normally tend to roll the rollers 33 off cam surfaces 36, the force of friction between washer 42 and friction surface 43 on rotatable element 29 produces a force in the same direction which acts directly upon cage 37 and positively rolls rollers 33 downward into recesses 34 until the frictional force so developed counterbalances the opposite force on cage 37 produced by spring 38. The frictional force is critical, since if it is too high the constant rubbing of surface 43 against washer 42 develops an excessive amount of heat which may eventually burn washer 42. I have found that the force produced by the viscosity of the lubricant, which is normally present between washer 42 and surface 43, is sufficient to counterbalance the force of spring 38, and that the total pressure developed by the spring 46 must not be such as to force all of the oil or lubricant out from between washer 42 and surface 43. In the example chosen for illustration three such balls 45 and springs 46 are used, each spring developing just a few ounces of pressure. The total pressure developed is, of course, a function of the total area of the contacting surfaces and their effective radius.

To make sure that there is no contact between rollers 33 and surface 30 when element 29 is rotating, a shield 47 is provided in close proximity to, but not in contact with, surface 30. Said shield 47 is anchored by means of a tab 48 or otherwise to a fixed element 49 so that it will always bear the same relation to recesses 34 and cammed surfaces 36. Said shield 47 is provided with slots 50 which are so positioned relative to rollers 33 and recesses 34 that when contact is desired between the rollers and surface 30, said rollers will be operating in slots 50, but when contact is not desired, said rollers will be withdrawn into recesses 34 and will then contact the inner surface 51 of shield 47.

Since the frictional force developed between washer 42 and surface 43 is dependent upon relative rotation between element 29 and cage 37 the force opposing the action of spring 38 will diminish with the speed of sun gear 17 and will ultimately disappear when sun gear 17 ceases to rotate. Spring 38 however, is constantly effective to bias cage 37 in a counterclockwise direction, the biasing force remaining substantially constant. With the gradual disappearance of the counterbalancing force, rollers 33 will be urged up ramps 35 and upon cammed surfaces 36 into the slots 50 and into engagement with surface 30 until full wedging action is secured such that sun gear 17 is held against reverse rotation.

It is apparent from the foregoing description that the action of the counterbalancing control means is automatic and requires no attention on the part of the operator.

Although the invention has been described with respect to a specific embodiment, it is understood that it may be applied equally as well to a ball type of one-way brake, to one-way clutches of the roller-and-cam or ball type, or to one-way devices, either brakes or clutches, using sprags, and to such devices regardless of the shape of a rotating surface 30. Thus the surface may be a portion of a cone, or it may be in a plane which is normal to the axis of rotation of the rotatable member. The scope of the invention therefore, should not be limited to the foregoing description but should be determined by the appended claims.

I claim:

1. A coupling device comprising a rotatable element, a second element, said elements having spaced surfaces, the surface of the rotatable element being generated by a line rotated about the center of rotation of the rotatable element and the surface of the second element being serrated to provide a plurality of individual surfaces inclined with respect to the generated surface, wedge means cooperating with the inclined surfaces and adapted in one direction of rotation of the rotatable element to be urged out of wedging contact therewith, means controlled by rotation of the rotatable element in said one direction for bodily moving the wedge means in the direction of rotation of the rotatable element, and a shield interposed between the wedge means and the generated surface when the means controlled by rotation of the rotatable element moves the wedge means out of contact with the generated surface.

2. A coupling device comprising a rotatable element, a second element, said elements having spaced surfaces, the surface of the rotatable element being generated by a line rotated about the center of rotation of the rotatable element and the surface of the second element being serrated to provide a plurality of individual surfaces inclined with respect to the generated surface, wedge means between the elements, means constantly urging said wedge means into contact with the generated surface, means controlled by rotation of the rotatable element in one direction for counteracting the effect of the urging means and moving the wedge means out of contact with the generated surface, and a shield associated with the second element and interposed between the wedge means and the generated surface when the rotatable element is rotating in said one direction.

3. A control for a one-way brake mechanism, said mechanism comprising a fixed element having a plurality of recesses connected to inclined cam surfaces in one surface thereof, a rotatable element to be braked, said element telescoping over the cam surfaces of the fixed element, rollers between the fixed and rotatable elements positioned in the recesses of the fixed element, a roller cage oscillatable relative to the fixed element and adapted to assume a position wherein the rollers are on the cams and in contact with the rotatable element, spring means normally urging the cage in a direction to cause the rollers to coact with the cam surfaces, a friction surface on the rotatable element, a friction surface on the cage, means urging the cage toward the rotatable element in a direction to cause the friction surfaces to come together, and a lubricant between the friction surfaces, said means causing the friction surfaces to come together, being insufficient to cause the lubricant to be forced outward from between the friction surfaces.

4. A one-way brake as described in claim 3, and a fixed shield located in the space between the elements and having apertures over the cam surfaces of the fixed element such that the rollers pass through the apertures into contact with the rotatable element when said element is to be braked and pass under the shield when the rotatable element is not braked, to prevent contact between the rollers and rotatable elements.

5. A control for a one-way brake mechanism, said mechanism comprising a fixed element having a plurality of recesses connected to inclined cam surfaces in one surface thereof, a rotatable element to be braked, said element telescoping over the cam surfaces of the fixed element, rollers between the fixed and rotatable elements positioned in the recesses of the fixed element, a roller cage oscillatable relative to the fixed element and adapted to assume a position wherein the rollers are on the cams and in contact with the rotatable element, a slot in the fixed element, a lug on the cage extending into the slot, said lug being narrower than the slot so as to be movable therein, spring means normally urging the cage in a direction to cause the rollers to coact with the cammed surfaces, a friction surface on the rotatable element, a friction surface on the cage, means acting upon the lug to urge the cage toward the rotatable element in a direction to cause the friction surfaces to come together, and lubricant between the friction surfaces, said means causing the friction surfaces to come together being insufficient to cause all of the lubricant to be forced outward from between the friction surfaces.

6. A control for a one-way brake mechanism, said mechanism comprising a fixed element having a plurality of recesses connected to inclined cammed surfaces in one surface thereof, a rotatable element to be braked, said element telescoping over the cammed surfaces of the fixed element, rollers between the fixed and rotatable elements positioned in the recesses of the fixed element, a roller cage oscillatable relative to the fixed element and adapted to assume a position wherein the rollers are on the cams and in contact with the rotatable element, a radial flange on the cage having lugs extending radially therefrom, spring means acting upon the lugs and normally urging the cage in a direction to cause the rollers to coact with the cam surfaces, a friction surface on the rotatable element, a friction facing secured to the radial flange of the cage, means acting upon the lugs and urging the cage toward the rotatable element in a direction to cause the friction facing and friction surface to come together, and a lubricant between the facing and friction surface, said means causing the facing and friction surface to come together being insufficient to cause the lubricant to be forced outward from between the friction surfaces.

CARL J. CONKLE.